US007796670B1

(12) United States Patent
Fujikawa et al.

(10) Patent No.: US 7,796,670 B1
(45) Date of Patent: Sep. 14, 2010

(54) DIODE LASER PUMPED SOLID STATE LASER AMPLIFIER AND DIODE LASER PUMPED SOLID STATE LASER

(75) Inventors: Shuichi Fujikawa, Tokyo (JP); Tetsuo Kojima, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 3252 days.

(21) Appl. No.: 08/938,700

(22) Filed: Sep. 26, 1997

(30) Foreign Application Priority Data

Mar. 28, 1997 (JP) .................................. 9-078307

(51) Int. Cl.
*H01S 3/09* (2006.01)
*H01S 3/091* (2006.01)
(52) U.S. Cl. .......................................... 372/75; 372/69
(58) Field of Classification Search ................ 372/75
See application file for complete search history.

(56) References Cited

U.S. PATENT DOCUMENTS

| 4,924,474 | A |   | 5/1990  | Yagi et al.   |        |
|-----------|---|---|---------|---------------|--------|
| 5,033,058 | A | * | 7/1991  | Cabaret et al.| 372/70 |
| 5,058,980 | A | * | 10/1991 | Howerton      | 372/70 |
| 5,661,738 | A | * | 8/1997  | Yasui et al.  | 372/35 |
| 5,781,580 | A | * | 7/1998  | Winik         | 372/75 |

FOREIGN PATENT DOCUMENTS

DE       195 48 635 A       6/1996

| JP | 04035077 A  |   | 2/1992  |
|----|-------------|---|---------|
| JP | 06350172    | * | 12/1994 |
| JP | 06350172 A  |   | 12/1994 |

OTHER PUBLICATIONS

Walter Koechner, "Solid-State Laser Engineering 4th Edition" Springer-Verlag Berlin 1996, pp. 360-361.
Walter Koechner, "Solid-State Later Engineering 4th Edition" Spinger-Vverlag Berlin 1996, pp. 391-392.
N. Uehara, et al "Continuous-wave TEM00-mode 26.5W-output virtual-point-source diode-array-pumped Nd: YAG laser" Optics Letters, vol. 20, pp. 1707-1709, 1995.

* cited by examiner

*Primary Examiner*—Armando Rodriguez
(74) *Attorney, Agent, or Firm*—Sughrue Mion, PLLC

(57) ABSTRACT

A diode laser pumped solid-state laser amplifier capable of homogenizing the distribution of heat dissipation levels on a section of a solid-state laser rod and not causing a bifocal phenomenon, and a diode laser pumped solid-state laser using the diode laser pumped solid-state laser amplifier. A diode laser pumped solid-state laser amplifier includes a solid-state laser rod having an optical axis along which a laser beam propagates and includes an active medium therein and a plurality of pumping sources having optical axes that run on a plane orthogonal to the axial core of the solid-state laser rod and are separated by a given distance from the axial core of the solid-state laser rod. When pumping light rays are projected on a plane orthogonal to the axial core of the solid-state laser rod, the plurality of pumping sources are located at equiangular intervals with respect to the axial core of the solid-state laser rod.

2 Claims, 11 Drawing Sheets

MAGNITUDE OF DEVIATION : 0 mm

MAGNITUDE OF DEVIATION : 1 mm

MAGNITUDE OF DEVIATION : 2 mm

DIODE LASER PUMPED SOLID STATE LASER AMPLIFIER AND DIODE LASER PUMPED SOLID STATE LASER

BACKGROUND OF THE INVENTION

1. Field of the Invention

The present invention relates to a diode laser pumped solid-state laser amplifier that uses a diode laser as an pumping source, and to a diode laser pumped solid-state laser.

2. Description of the Related Art

FIG. 17 is a diagram showing the structure of a pumping module employed in a conventional diode laser pumped solid-state laser amplifier that is described in a literature, for example, "Solid-state Laser Engineering" (Springer-Verlag, P.348). In the drawing, two diode laser arrays 3 are fixed to one flank of a heat sink 5 shaped like a triangular prism with light-emitting portions 4 thereof directed in the left-hand direction in FIG. 17. A cylindrical lens 34 for converging pumping light rays emanating from the diode laser arrays 3 is fixed to the tips of the light-emitting portions 4. An electric cooler 301 for adjusting the temperature of the heat sink 5 is fixed to the bottom on the opposite side of the heat sink 5. A heat exchanger 302 for removing heat from the diode laser arrays 3 via the heat sink 5 and electric cooler 301 is fixed to the electric cooler 301.

Cooling water is circulated through the heat exchanger 302, whereby the heat exchanger exchanges heat with the diode laser arrays 3 via the heat sink 5. Since the electric cooler 301 is interposed between the heat exchanger 302 and heat sink 5, once the heat sink 5 is cooled using the electric cooler 301, the temperature of the diode laser arrays 3 can be adjusted quickly without any change in temperature of the cooling water to be circulated through the heat exchanger 302.

The two diode laser arrays 3 are fixed to the heat sink 5 while oriented in the same direction. The cylindrical lens 34 is fixed to the faces of the light-emitting portions 4 of the diode laser arrays 3. Pumping light-rays emanating from the light-emitting portions 4 are therefore converged by the cylindrical lens 34. Moreover, the electric cooler 301 is interposed between the heat sink 5 and heat exchanger 302, the wavelength of pumping light rays emanating from the diode laser arrays 3 can be adjusted by adjusting the temperature of the heat sink 6 using the electric cooler 301. The components of the heat sink 5, diode laser arrays 3, cylindrical lens 34, electric cooler 301, and heat exchanger 302 constitute one pumping module 90.

FIG. 18 is an oblique view showing a state in which the pumping modules 90 each having the components shown in FIG. 17 are fixed to a support plate 303 together with a solid-state laser rod 1 and flow tube 2. In this structure, one solid-state laser rod 1 is encircled by four pumping modules 90. Each pumping module 90 has the end surface of the heat sink 5 thereof fixed to the support plate 303, and has thus one end thereof supported. The light-emitting portions of the diode laser arrays 3 fixed to the four pumping modules 90 are directed toward the axial core of the solid-state laser rod 1. Pumping light rays emanating from the light-emitting portions 4 are each affected by the cylindrical lenses 34 so that a point of condensing is located on the axial core of the solid-state laser rod 1. The solid-state laser rod 1 is sheathed by the flow tube 2. A cooling medium flows through a space created between the solid-state laser rod 1 and flow tube 2, whereby the solid-state laser rod 1 is cooled.

In a device for pumping the solid-state laser rod 1 using pumping light and amplifying light passing through the solid-state laser rod 1, generally, when the distribution of heat dissipation levels on a section of the laser rod becomes inhomogeneous, a bifocal phenomenon or a phenomenon that the focal length of the laser rod becomes different from local point to local point on a section of the laser rod takes place while the solid-state laser rod 1 is exerting a lens effect due to heat dissipation. When the bifocal phenomenon takes place, it becomes impossible to sufficiently correct the lens effect of the solid-state laser rod 1 with the employment of an ordinary optical element such as a spherical mirror, convex lens, or concave lens. This poses a problem that the performance of amplification of high-quality laser beam deteriorates and stability is impaired.

In the conventional diode laser pumped solid-state laser amplifier having the foregoing components and using a diode laser as a pumping source, unlike the one using an arc lamp as a pumping source, no special care has been taken of the homogeneity of the distribution of heat dissipation levels on a section of the laser rod.

SUMMARY OF THE INVENTION

The present invention attempts to solve the above problems. An object of the present invention is to provide a diode laser pumped solid-state laser amplifier using a diode laser as an pumping source, capable of homogenizing the distribution of heat dissipation levels on a section of a solid-state laser rod, and not bringing about a bifocal phenomenon, and to provide a diode laser pumped solid-state laser using the amplifier.

In order to achieve the above object, according to one aspect of the present invention, there is provided a diode laser pumped solid-state laser amplifier which comprises a solid-state laser rod extending along the optical axis of a laser beam and including an active medium therein, and a plurality of pumping light sources having pumping light ray optical axes that run in a plane orthogonal to the axial core of the solid-state laser rod and are separated by a predetermined distance from the axial core of the solid-state laser rod, wherein when the optical axes of the plurality of pumping light sources are projected on a plane orthogonal to the axial core of the solid-state laser rod, the optical axes of the plurality of pumping light sources are located at equiangular intervals with the axial core of the solid-state laser rod as an axis of rotation on the plane.

According to another aspect of the present invention, there is provided a diode laser pumped solid-state laser amplifier which has at least three pumping light sources are included. When pumping light rays emanating from the pumping light sources are projected on a plane orthogonal to the axial core of the solid-state laser rod, the pumping light rays are irradiated to the solid-state laser rod in at least three directions on the plane.

According to still another aspect of the present invention, there is provided a diode laser pumped solid-state laser amplifier which has optical elements, interposed between the solid-state laser rod and the pumping light sources for positioning the pumping light ray optical axes with respect to the solid-state laser rod.

According to a further aspect of the present invention, there is provided a diode laser pumped solid-state laser amplifier, wherein the optical elements for positioning the pumping light ray optical axes are optical waveguide plates.

According to a still further aspect of the present invention, there is provided a diode laser pumped solid-state laser amplifier which has a reflector having openings for passing the pumping light rays and having a diffusive reflect surface which is provided so as to enclose the solid-state laser rod.

According to another aspect of the present invention, there is provided a diode laser pumped solid-state laser amplifier which has optical waveguide plates provided in the openings of the reflector as optical elements for positioning the pumping light ray optical axes.

According to still another aspect of the present invention, there is provided a diode laser pumped solid-state laser amplifier, wherein the reflector also serves as a means for fixing the pumping light sources.

According to a further aspect of the present invention, there is provided a diode laser pumped solid-state laser amplifier which has side plates for supporting both ends of the solid-state laser rod respectively, a plurality of pumping modules arranged along the solid-state laser rod, each pumping module being constituted with a flat substrate having a hole formed at the center thereof through which the solid-state laser rod passed and the pumping light sources fixed by means for fixing it to the substrate, and connecting and fixing means for connecting a plurality of the pumping modules, which are arranged along the solid-state laser rod, to each other and fixing the pumping modules to the side plates.

According to a still further aspect of the present invention, there is provided a diode laser pumped solid-state laser amplifier, wherein the pumping modules are connected with each other at a predetermined angle while successively shifting the angle about the solid-state laser rod as a center axis.

According to another aspect of the present invention, there is provided a diode laser pumped solid-state laser which comprises a solid-state laser rod extending along the optical axis of a laser beam and including an active medium therein, a plurality of pumping light sources having pumping light ray optical axes that pass through a plane orthogonal to the axial core of the solid-state laser rod and are separated by a predetermined distance from the axial core of the solid-state laser rod, a partial reflection mirror set to one end of the solid-state laser rod, and a total reflection mirror set to the other end of the solid-state laser rod, wherein when the optical axes of the plurality of pumping light sources are projected on a plane orthogonal to the axial core of the solid-state laser rod, the optical axes of the plurality of pumping light sources are located at equiangular intervals with the axial core of the solid-state laser rod as an axis of rotation on the plane.

DESCRIPTION OF THE PREFERRED EMBODIMENTS

First Embodiment

Figure 1:
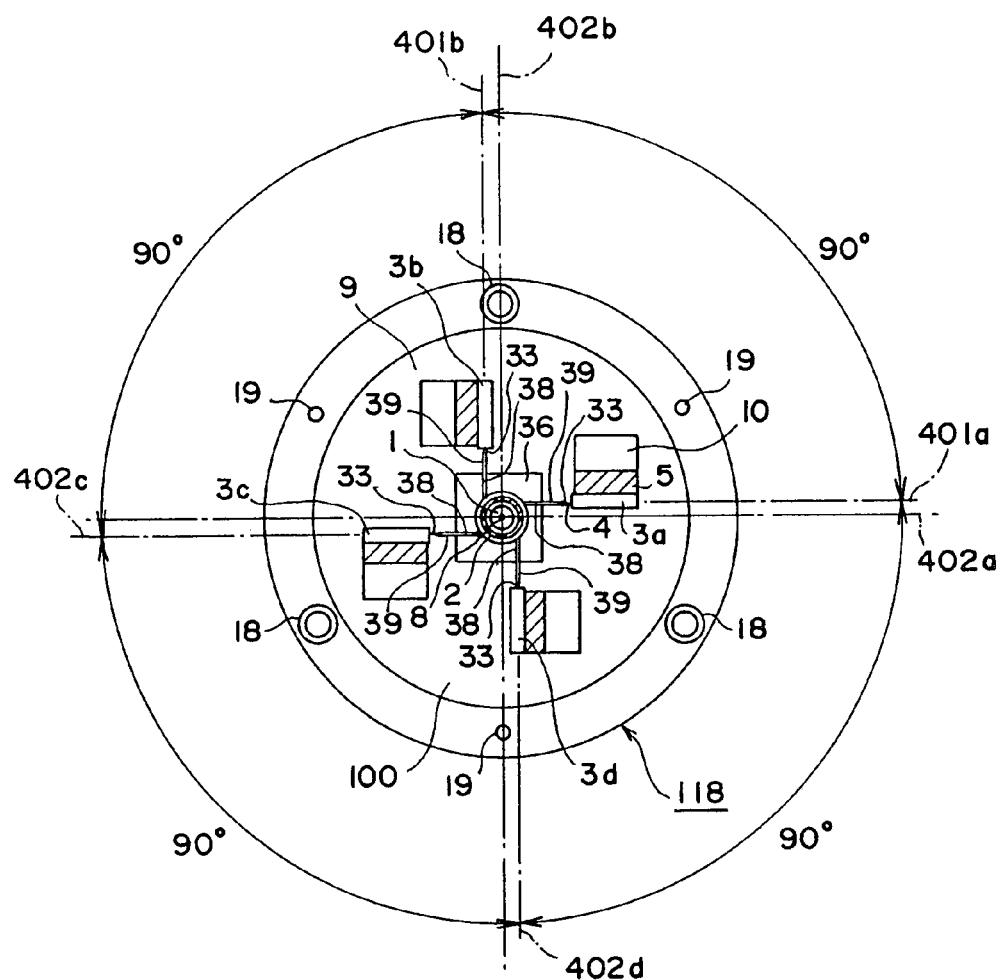
FIG. 1 is a front view of a pumping module included in a diode laser pumped solid-state laser amplifier of the present invention.
Figure 2:
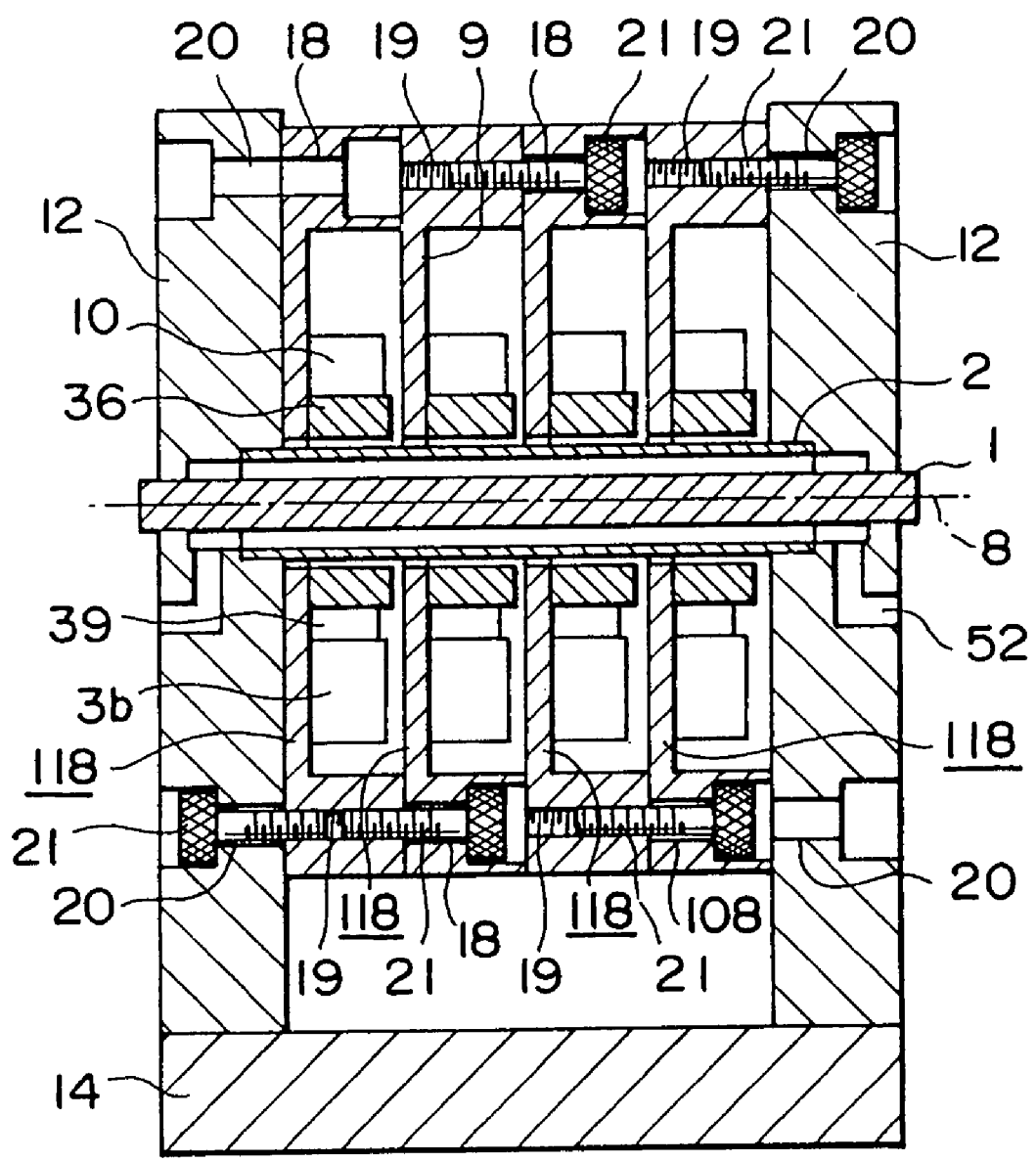
FIG. 2 is a cross-sectional view of the diode laser pumped solid-state laser amplifier of the present invention.

FIG. 1 is a front view of a pumping module in a diode laser pumped solid-state laser amplifier of the present invention. FIG. 2 is a cross-sectional view of the diode laser pumped solid-state laser amplifier of the present invention. In FIG. 1, a disk-like substrate 9 has a round flange formed along the circumference on the margin thereof so that the round flange juts out perpendicularly to a main surface of the substrate 9, and has a hole bored in the center thereof. On the main surface of the substrate 9, four fixing blocks 10 are arranged equidistantly at intervals of 90° with the center hole as a center. Four diode laser arrays 3a, 3b, 3c, and 3d serving as pumping sources that are a plurality of light-emitting devices arranged linearly are fixed to the fixing blocks 10 via heat sinks 5. The fixing blocks 10 serve as means for fixing the diode laser arrays 3a, 3b, 3c, and 3d that are pumping sources.

The substrate 9, and the fixing blocks 10, diode laser arrays 3a, 3b, 3c, and 3d, and heat sinks 5 fixed to the main surface of the substrate 9 constitute one pumping module 118. The round flange formed on the margin of the substrate 9 has counterbored joint through holes 18 and joint screw holes 19. The counterbored joint through holes 18 and joint screw holes 19 bored in the substrate 9 are arranged alternately at intervals of 60° on one circle concentric with the solid-state laser rod 1. A triangle defined by linking the centers of the three counterbored joint through holes 18 bored in the substrate 9, and a triangle defined by linking the centers of the three joint screw holes 19 are equilateral triangles each having three sides of the same length and are mutually congruent. The diameter of a counterbore of each of the counterbored joint through holes 18 is larger than the diameter of a bolt head of a hexagonal socket head bolt to be fitted into a joint screw hole. Moreover, the depth of the counterbore is larger than the height of the bolt head.

A reflector 36 is placed on the substrate 9 so that it can enclose the solid-state laser rod 1. The reflector 36 has a reflection surface, which is a diffusive reflect surface and made of, for example, a ceramic, as an inner surface thereof opposed to the solid-state laser rod 1. An introduction port 38 through which pumping light 33 is introduced to the inside of the reflector 36 is formed at four positions of the reflector 36. An optical waveguide plate 39 that is an optical element having an end surface thereof processed to prevent reflection of pumping light 33 is placed in the introduction ports 38, thus facilitating introduction of pumping light 33 into the reflector 36.

The diode laser arrays 3a, 3b, 3c, and 3d have optical axes 401a, 401b, 401c, and 401d respectively, and emit pumping light 33 through light-emitting portions 4 thereof along the optical axes. The optical axes 401a, 401b, 401c, and 401d run on the same plane orthogonal to the axial core 8 of the solid-state laser rod 1 and are separated by a given distance from the axial core 8 of the solid-state later rod 1. Moreover, adjoining ones of the optical axes 401a, 401b, 401c, and 401d cross each other at right angles. A line parallel to the optical axes 401a and 401c and passing through the center of the solid-state laser rod 1 shall be a center line 402a, and a line parallel to the optical axes 401b and 401d and passing through the center of the solid-state laser rod 1 shall be a center line 402b. The optical axes 401a and 401c are separated by a given distance in opposite directions from the center line 402a, and the optical axes 401b and 401d are separated by the given distance in opposite directions from the center line 402b. In other words, the optical axes 401a, 401b, 401c, and 401d are deviated by the given distance from the lines passing through the axial core of the solid-state laser rod 1. The direction of deviation is comparable to the same direction of rotation with respect to the axial core 8 of the solid-state laser rod 1. That is to say, the optical axes are deviated in the counterclockwise direction in FIG. 1.

Putting it another way, the diode laser arrays 3a, 3b, 3c, and 3d that are pumping sources are arranged at equiangular intervals with respect to the axial core 8 of the solid-state laser rod 1 on the same plane orthogonal to the axial core 8 of the solid-state laser rod 1. In other words, the optical axes 401a, 401b, 401c, and 401d are arranged at equiangular intervals with the axial core 8 of the solid-state laser rod 1 as an axis of rotation on the same plane orthogonal to the axial core 8 of the solid-state laser rod 1.

In FIG. 2, side plates 12 are rested on a lower plate 14. The two side plates 12 have both ends of the solid-state laser rod 1 penetrated through holes bored in the main surfaces thereof, thus supporting the solid-state laser rod 1. The solid-state laser rod 1 is sheathed with a flow tube 2. The flow tube 2 is cylindrical and sheathing the solid-state laser rod 1 entirely in the longitudinal direction. Both ends of the flow tube 2 are also supported by the side plates 12. One of the side plates 12 has an inflow port 51 through which a cooling medium, for example, pure water is supplied. The other side plate 12 has an outflow port 52 through which the cooling medium is discharged. The cooling medium supplied through the inflow port 51 flows through a space defined between the solid-state laser rod 1 and flow tube 2, thus cooling the solid-state laser rod 1 directly. The cooling medium passing through the flow tube 2 is discharged through the outflow port 52.

A plurality of pumping modules 118 have the solid-state laser rod 1 and flow tube 2 penetrated through the center holes of the substrates 9 thereof, and are layered in the same direction. The side plates 12 have counterbored fixing through holes 20. The pumping modules 118 and side plates 12 are joined and fixed by hexagonal socket head bolts 21 that are joining/fixing means.

For joining the pumping modules 118, as shown in FIG. 2, the counterbored joint through holes 18 of a pumping module 118 are aligned with the joint screw holes 19 of the leftmost pumping module 118. The hexagonal socket head bolts 21 are then inserted from left to right. The counterbored joint through holes 18 and joint screw holes 19 which are bored on the margin of the substrate 19 are located in one circle concentric with the solid-state laser rod 1. The positional relationships between the solid-state laser rod 1 and the diode laser arrays 3a, 3b, 3c, and 3d that are pumping sources can therefore remain constant all the time. Moreover, the plurality of counterbored fixing through holes 20 having the same positional relationships as the counterbored joint through holes 18 and joint screw holes 19 which are bored on the margins of the substrates 9 are bored in the side plates 12. The leftmost and rightmost substrates 9 are brought into close contact with the side plates 12. The hexagonal socket head bolts 21 are inserted into the counterbored fixing through holes 20 overlying the joint screw holes 19, whereby the substrates 9 and pumping modules 118 are joined.

The pumping module 118 shown in FIG. 1 has the four diode laser arrays 3a, 3b, 3c, and 3d that are pumping sources, irradiates pumping light 33 to the solid-state laser rod 1 in four directions, and thus pumps the solid-state laser rod 1. The optical axes 401a, 401b, 401c, and 401d along which the pumping light rays 33 emanating from the diode laser arrays 3a, 3b, 3c, and 3d propagate are deviated from the center lines passing through the center of the solid-state laser rod 1. The distribution of pumped densities on a section of the solid-state laser rod 1 can therefore be changed. When the magnitude of deviation is set to a given value, the distribution of heat dissipation levels on a section of the solid-state laser rod 1 can be homogenized. The underlying idea will be described below.

In general, particles excited from a ground state to an excited state due to absorption of pumping light return to the ground state through a plurality of transitions. In the plurality of transitions from the excited state to the ground state, a difference in energy between the states is converted into heat during relaxation caused by a nonradiative transition in which no light is emitted. This causes the solid-state laser rod 1 to dissipate heat. When the solid-state laser rod is cooled uniformly by cooling the whole surroundings thereof according to a prior art, if the distribution of heat dissipation levels on a section of the laser rod is homogeneous, the distribution of temperatures on the section of the laser rod is expressed like a paraboloid having a peak in the center. The refractive index of the solid-state laser rod 1 is nearly proportional to temperature. Therefore, if the distribution of temperatures on a section of the laser rod is expressed as a paraboloid, the solid-state laser rod 1 acts as an ideal lens. Consequently, the lens effect of the solid-state laser rod 1 can be corrected using a general optical element such as a spherical mirror, convex lens, or concave lens. Eventually, high-quality laser beam can be amplified stably and efficiently.

However, once the distribution of heat dissipation levels on a section of the laser rod becomes inhomogeneous, while the solid-state laser rod 1 is exerting the lens effect due to heat dissipation, a bifocal phenomenon in which the focal length of the solid-state laser rod becomes different from local point to local point on a section of the solid-state laser rod takes place. When the bifocal phenomenon takes place, the lens effect of the solid-state laser rod 1 cannot be corrected sufficiently by means of the general optical element such as a spherical mirror, convex lens, or concave lens. This leads to deteriorated performance of amplification of high-quality laser beam and impaired safety.

For amplifying high-quality laser beam stably and highly efficiently, it is indispensable to attain homogeneous distribution of heat dissipation levels on a section of the solid-state laser rod. However, in the past, emphasis has been put mainly on the homogeneity of distribution of pumped densities but no care has been taken of the homogeneity of distribution of heat dissipation levels. This is attributable to the fact that an arc lamp has been used as an pumping source. A process from an excited state to the ground state can be divided into a transitional process from the excited state to an upper state and a transitional process from the upper state to the ground state. A majority of particles excited and brought to the excited state shifts to the upper state through a nonradiative process alone. Once the energy level of an excited state, and the strength of excitation (number of particles to be excited and brought to the excited state per unit time and unit volume) are determined, an amount of heat generated during the transitional process from the excited state to the upper state can be held constant. On the other hand, there are a plurality of transitional processes between the upper state and the ground state. A radiative transition in which light is emitted due to spontaneous emission or stimulated emission and then energy is radiated, and a nonradiative transition in which energy is radiated because of heat without light emission coexist in each process. The number of particles undergoing each process varies depending on the presence or absence of laser oscillation or the intensity of laser beam passing through the solid-state laser rod. An amount of heat stemming from a nonradiative transition included in each process is different from process to process. Even if the strength of excitation in the same excited state is the same, an amount of heat generated in the solid-state laser rod 1 during the process from the upper state to the ground state varies depending on the presence or absence of laser oscillation or the intensity of laser beam passing through the laser rod. For example, the ratio of particles undergoing the process that includes a nonradiative transition bringing about a large difference in energy increases, an amount of heat generated during the process from the upper state to the ground state increases.

In a solid-state amplifier using an arc lamp as an pumping source, since the arc lamp permits a wide emission spectrum. Particles are therefore excited to be brought to a stationary state of much higher energy level than the upper state because of ultraviolet components whose frequencies fall within the emission spectrum. For this reason, an amount of heat generated during the nonradiative transitional process from an excited state to the upper state occupies a majority part of heat dissipated from the solid-state laser rod. The presence or absence of laser oscillation during the transitional process from the upper state to the ground state or a change in amount of dissipated heat dependent on the intensity of laser beam can therefore be ignored. In other words, when the arc lamp is used as an pumping source, an amount of heat dissipated from the solid-state laser rod is independent of the presence or absence of laser oscillation or the intensity of laser beam and is substantially determined with an excited state. Consequently, once the distribution of pumped densities is homogenized, the distribution of heat dissipation levels on a section of the solid-state laser rod can be regarded as homogeneous.

It has long been thought that the discussion similar to the foregoing one, that is, the assumption that the distribution of bumped densities and the distribution of heat dissipation levels agree with each other can be adapted to a diode laser pumped solid-state laser amplifier using a diode laser as a pumping source to be dealt with in the present invention.

However, when a diode laser array is used as a pumping source, the emission spectrum becomes very narrow. When the energy of an excited state closest to the upper state is matched with an oscillating quantity provided by the diode laser array, it becomes possible to excite particles selectively to an excited state closest to the upper state. Compared with excitation using the arc lamp, an amount of heat generated during the process from the excited state to the upper state is markedly small. Consequently, a change in amount of dissipated heat which occurs during heat dissipation of the solid-state laser rod and depends on a state of laser oscillation such as the presence or absence of laser oscillation or the intensity of laser beam cannot be ignored.

Figure 3:
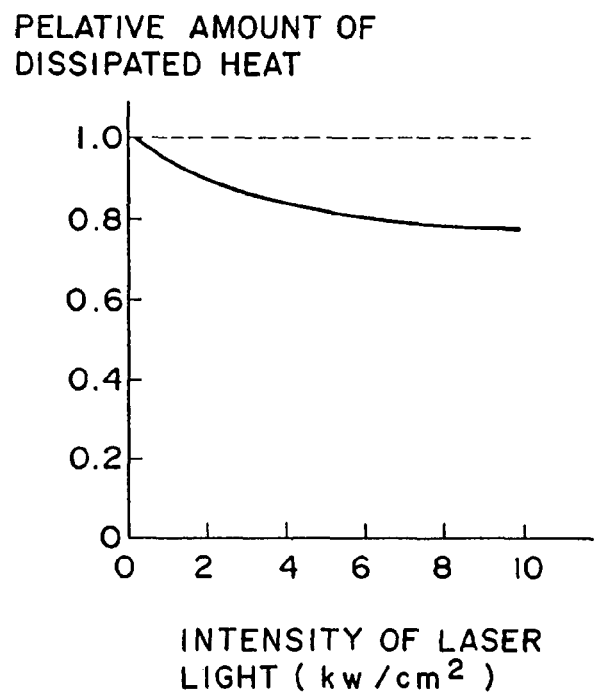
FIG. 3 is a graph showing the relationship between the intensity of laser beam and an amount of dissipated heat.

FIG. 3 shows a change in amount of dissipated heat in relation to the intensities of laser beam passing through a solid-state laser medium pumped by a diode laser, wherein when the intensity of laser beam is 0, the amount of dissipated heat is 1. As apparent from the graph, the amount of dissipated heat decreases by 20% or more with an increase in intensity of laser beam. This is because that the number of particles undergoing a process of stimulated emission causing laser oscillation increases and the number of particles undergoing a transitional process causing a large amount of dissipated heat decreases. The change of 20% or more in amount of dissipated heat is large enough to impair stability during amplification.

Figure 4:
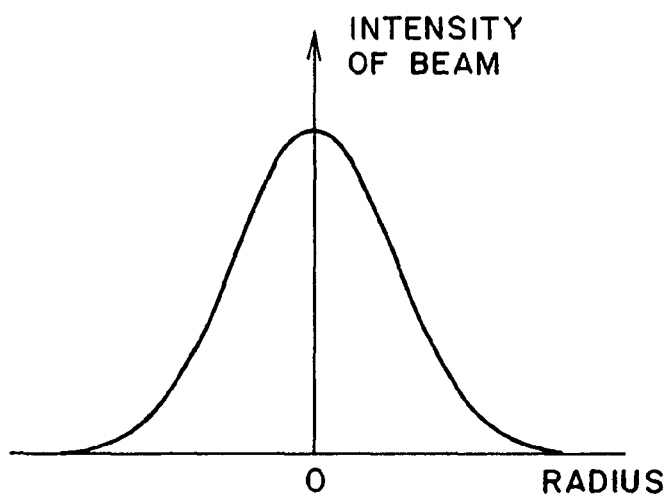
FIG. 4 is a graph showing the distribution of beam intensities in the lowest-order transverse mode.

Amplification or generation of the laser beam in the lowest-order transverse mode which exhibits high performance of condensing and has a high application value will be described. FIG. 4 shows the distribution of intensities of a beam in the lowest-order transverse mode. The lowest-order transverse mode is generally described as the TEM00 mode, and expressed with an axially symmetric Gaussian distribution having a sole peak in the center. When a beam in the lowest-order transverse mode passes through the solid-state laser rod 1, the beam has high intensity in relation to the center of a section of the solid-state laser rod and has lower intensity in relation to the perimeter of the section of the solid-state laser rod. As shown in FIG. 3, an amount of dissipated heat in an area of the solid-state laser rod undergoing light of higher intensity is smaller. Assuming that excitation occurring in the solid-state laser rod is homogeneous, when the intensity of laser beam passing through the solid-state laser rod 1 is too feeble to cause remarkable stimulated emission, the distribution of heat dissipation levels on a section of the solid-state laser rod can be regarded as homogeneous.

However, when laser beam is amplified in practice, since high-intensity laser beam passes through the solid-state laser rod, when a beam in the lowest-order transverse mode passes through a section of the solid-state laser rod, stimulated emission becomes outstanding in the center of a section of the solid-state laser rod in which the beam has high intensity. This causes the number of particles undergoing a transitional process causing laser oscillation to increase. A decrease in amount of dissipated heat gets therefore larger. As a result, the distribution of heat dissipation levels on the section of the solid-state laser rod is expressed as an inhomogeneous distribution showing a drop in amount of dissipated heat in the center thereof. When the lens effect of the solid-state laser rod 1 is exerted due to heat dissipation, a bifocal phenomenon takes place. When a beam in the lowest-order transverse mode is generated and amplified, the distribution of pumped densities is expressed to have a rather high peak in relation to the center of a section of the solid-state laser rod. The distribution of pumped densities should preferably be such that when the beam in the lowest-order transverse mode passes, the distribution of heat dissipation levels on the section of the solid-state laser rod becomes homogeneous.

The distribution of pumped densities can be calculated according to a ray tracing technique on the basis of the magnitude of deviation of the optical axes 401a, 401b, 401c, and 401d, the absorption coefficient relative to pumping light in the solid-state laser rod 1, and the structure of a pumping unit such as the shape of the reflector 36 and the state of the surface thereof. The number of particles undergoing each transitional process can be calculated by solving a rate equation descriptive of each stationary energy state of an active medium and a density of photons in laser beam. An amount of dissipated heat on a section of the solid-state laser rod can be obtained analytically. The distribution of temperatures on the section of the solid-state later rod is calculated using the distribution of heat dissipation levels, and the distribution of refractive indices is calculated using the distribution of temperatures. A focal length at a local point on the section of the solid-state laser rod can be calculated using a slope defined with the refractive indices.

Figure 5:
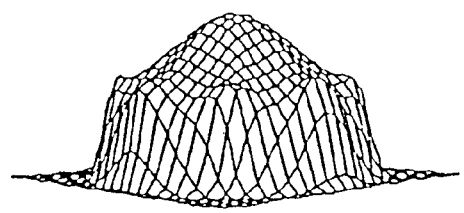
FIG. 5 is a diagram showing calculated values indicating the distribution of pumped densities on a section of a solid-state laser rod.
Figure 6:
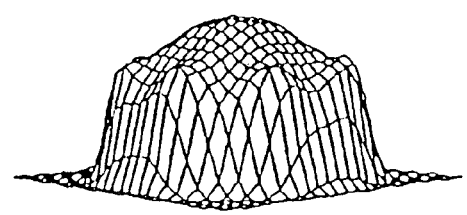
FIG. 6 is a diagram showing calculated values indicating the distribution of pumped densities on a section of the solid-state laser rod.
Figure 7:
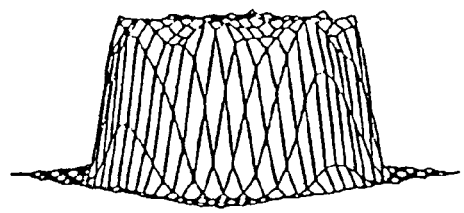
FIG. 7 is a diagram showing calculated values indicating the distribution of pumped densities on a section of the solid-state laser rod.

FIGS. 5, 6, and 7 show distributions of pumped densities on a section of the solid-state laser rod in relation to magnitudes of deviation of the optical axes; 0 mm, 1 mm, and 2 mm. With the increase in magnitude of deviation, the peak in the center of a distribution of pumped densities sinks. With the magnitude of deviation 2 mm, a nearly homogenous distribution of pumped densities is plotted.

Figure 8:
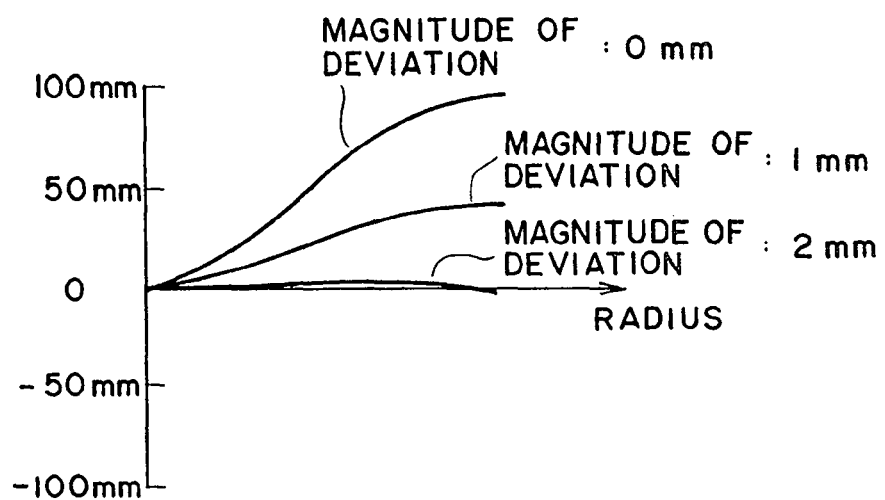
FIG. 8 is an explanatory graph showing a change in focal length in relation to positions in a radial direction on a section of the solid-state laser rod.

FIG. 8 shows a bifocal phenomenon deriving from the inhomogeneous distribution of heat dissipation levels, that is, a change in focal length from local point to local point as a function of a radius with the center axis of the rod set to 0 in relation to the magnitudes of deviation of 0 mm, 1 mm, and 2 mm on the assumption that laser beam passing through the solid-state laser rod 1 is feeble. When the bifocal phenomenon is not observed, the focal length remains constant irrespective of the radius. As an index indicating a difference in focal length from local point to local point on a section of the solid-state laser rod, which derives from the inhomogeneity of distribution of heat dissipation levels on the section of the solid-state laser rod, that is, a degree of a bifocal phenomenon, a difference between a maximum value and minimum value of the focal length on the section of the solid-state laser rod shall be defined as a bifocal rate. On the assumption that the laser beam passing through the solid-state laser rod 1 is feeble, the bifocal rate assumes a minimum value in relation to the magnitude of deviation of 2 mm associated with the most homogeneous distribution of pumped densities.

Figure 9:
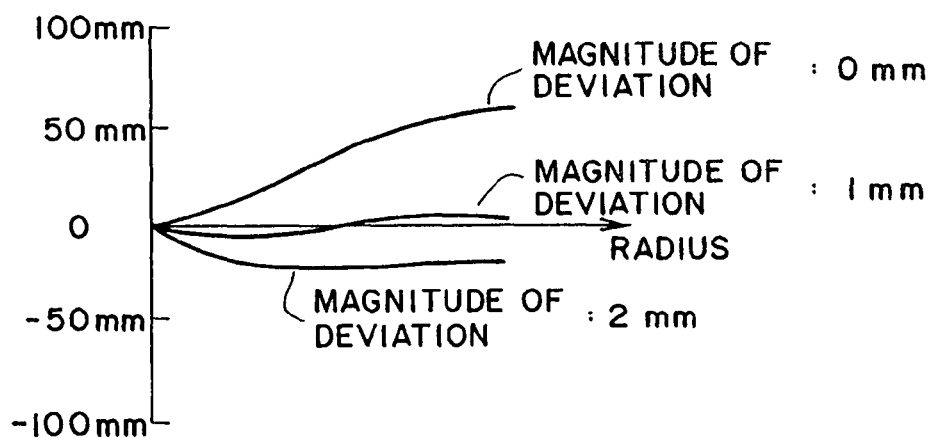
FIG. 9 is an explanatory graph showing a change in focal length in relation to positions in the radial direction on a section of the solid-state laser rod.

FIG. 9 shows a bifocal phenomenon deriving from the inhomogeneous distribution of heat dissipation levels, that is, a change in focal length as a function of a radius in relation to magnitudes of deviation of 0 mm, 1 mm, and 2 mm on the assumption that laser beam in the lowest-order transverse mode passes through the solid-state laser rod 1 with sufficient intensity without causing stimulated emission. Unlike the results shown in FIG. 8 on the assumption that passing light is feeble, when the magnitude of deviation is 1 mm, the above-defined bifocal rate is minimum. This means that when laser beam in the lowest-order transverse mode is amplified and generated, the magnitude of deviation should be set to 1 mm in order to obtain the homogeneous distribution of heat dissipation levels.

The description has proceeded on the assumption that laser beam in the lowest-order transverse mode passes through the solid-state laser rod 1. Even when laser beam in a higher-order mode passes, the magnitude of deviation should be determined according to presumable operating conditions, such as, the structure of the pumping unit, the strength of excitation, the density of molecules of an active medium, and the distribution of intensities of laser beam Passing through the solid-state laser rod 1 so that the bifocal rate observed on a section of the solid-state laser rod becomes minimum.

In this embodiment shown in FIGS. 1 and 2, the optical axes 401a, 401b, 401c, and 401d along which pumping light rays emanating from the four diode laser arrays 3a, 3b, 3c, and 3d propagate run on the same plane orthogonal to the axial core 8 of the solid-state laser rod 1, and are separated by a given distance from the axial core 8 of the solid-state laser rod 1. Moreover, the adjoining ones of the optical axes are crossing each other at right angles. The magnitudes of deviation of the optical axes 401a, 401b, 401c, and 401d are set to the aforesaid optimal value. A variation in distribution of heat dissipation levels occurring along the circumference of a section of the solid-state laser rod can therefore be minimized. Moreover, occurrence of a bifocal phenomenon can be suppressed. Consequently, the lens effect of the solid-state laser rod 1 can be corrected effectively using a spherical mirror, convex lens, or concave lens. Thus, laser beam of high beam quality can be amplified and generated stably and efficiently.

In the embodiment shown in FIGS. 1 and 2, pumping light rays emanating from the-diode laser arrays 3a, 3b, 3c, and 3d propagate along the optical waveguide plates fixed to the introduction ports 38 of the reflector 36, and fall on the reflector 36. The optical waveguide plates 39 are made of a material exhibiting a sufficiently higher refractive index than, for example, an adhesive to be brought into contact with an external member, such as, sapphire. A majority of pumping light incident on the optical waveguide plates 39 is reflected totally by the flanks of the optical waveguide plates 39, and introduced into the reflector 36 efficiently with a small loss. The positions of the optical axes along which pumping light rays propagate to be irradiated to the solid-state laser rod are defined by positions at which the optical waveguide plates 39 are placed. When the positions of the optical axes along which pumping light rays propagate are set to desired positions using optical elements, even if the diode laser arrays 3a, 3b, 3c, and 3d that are pumping sources are displaced from normal positions or angles at which they should be placed, since the positions of the optical axes along which pumping light rays propagate remains constant, stable distribution of pumped densities can be attained on a section of the solid-state laser rod all the time. Consequently, efficient amplification and generation of laser beam of high beam quality can be maintained stably. Moreover, the precision in placing the diode lasers 3 that are pumping sources is relaxed, and assembling of pumping modules is simplified. Furthermore, in this embodiment, the diode laser arrays 3a, 3b, 3c, and 3d and the reflector 36 are fixed to the same substrate 9. The positions of the optical axes along which pumping light rays propagate can be kept constant all the time irrespective of the position or angle at which the pumping module 118 is placed.

In this embodiment, the optical waveguide plates 39 are used as optical elements for defining the optical axes along which pumping light rays propagate. The optical elements are not limited to the optical waveguide plates. Even when cylindrical lenses or optical fibers are used, the same advantage can be exerted.

The end surfaces of the optical waveguide plates 39 in this embodiment on which pumping light rays fall are rectangular. For example, when a diode linear laser array having a plurality of light-emitting portions of diode lasers set in array is used as a pumping source, pumping light can be efficiently coupled to an optical element readily. Since an optical element utilizing refraction, such as, a lens is not used, placement can be carried out without any concern about a focal length or a direction of condensing. This leads to easy assembling and adjustment.

In the structure like the one of this embodiment that the reflector 36 is placed to encircle the solid-state laser rod 1 and pumping light rays are introduced into the reflector 36 through the introduction ports 38 of the reflector 36, since the introduction ports 38 do not reflect pumping light, the introduction ports 38 look like invalid areas in terms of the original operation of the reflector 36. For efficient pumping, the ratio of the area occupied by the introduction ports 38 to the whole area of the reflector 36 must be reduced. By the way, the employment of larger introduction ports 38 makes it easy to efficiently introduce pumping light rays into the reflector 36.

When the optical waveguide plates 39 are used to introduce pumping light rays into the reflector 36 as they are in this embodiment, the shape of the light-emitting portions can be readily matched with that of the end surfaces of the optical waveguide plates 39 through which pumping light rays are introduced. Even when the waveguide plates 39 are made thinner, pumping light rays can be transmitted efficiently owing to the operation of total reflection of the flanks of the optical waveguide plates 39. The introduction ports 38 of the reflector 36 through which pumping light rays are introduced can be made smaller while the efficiency in transmitting pumping light rays remains high. Moreover, pumping can be carried out efficiently.

This embodiment provides the structure for irradiating pumping light in four directions with respect to the center axis of the solid-state laser rod 1. Even in the structure for irradiating pumping light in two directions with respect to the center axis of the solid-state laser rod 1 so that the light falls laterally on the solid-state laser rod 1, and thus pumping the solid-state laser, the optical axes along which two pumping light rays propagate are set so that they are located at equiangular positions with respect to the center-axis direction of the solid-state laser rod 1, that is, at positions with 180° between them, separated by a given constant distance from a center line of the solid-state laser rod 1, and deviated from the center line in the same direction with respect to the center axis of the solid-state laser rod 1. This results in the improved homogeneity of the distribution of heat dissipation levels on a section of the solid-state laser rod.

However, in the structure for bidirectional pumping, the optical axes along which pumping light rays propagate are mutually parallel. Deviation of the optical axes occurs only in one direction on a section of the solid-state laser rod. Since the direction in which the optical axes are deviated is one direction, it is hard to homogenize the two-dimensional distribution of heat dissipation levels on a whole section of the rod. As a result, the degree of the homogeneity in distribution of heat dissipation levels becomes different between a direction identical to the direction of deviation and perpendicular to the optical axes and a direction perpendicular to the direction of deviation and parallel to the optical axes. The directivity in distribution of heat dissipation levels on a section of the solid-state laser rod cannot therefore be eliminated effectively.

Figure 10:
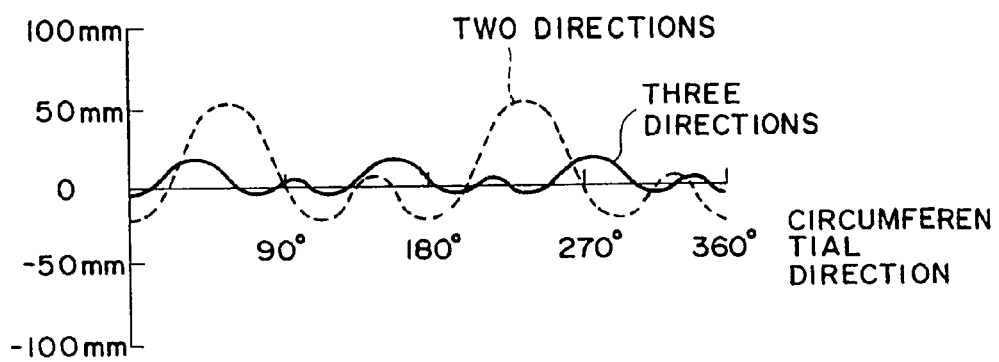
FIG. 10 is an explanatory graph showing a change in focal length in relation to positions in a circumferential direction on a section of the solid-state laser rod.

FIG. 10 shows a change in focal length from local point to local point in the circumferential direction on the margin of the solid-state laser rod occurring in a structure for irradiating pumping light to the solid-state laser rod 1 in two directions that are equiangular with respect to the center-axis direction of the solid-state laser rod 1, that is, in two directions having 180° between them, and the change in focal length occurring in a structure for irradiating pumping light to the solid-state laser rod 1 in three directions that are equiangular with respect to the center-axis direction of the solid-state laser rod 1, that is, in three directions set at intervals of 120°. In either of the structures, the magnitude of deviation of the optical axes is optimized in order to minimize the bifocal rate observed on a section of the solid-state laser rod. When the number of directions in which pumping light is irradiated is increased from two to three, while the optical axes along which pumping light propagate are kept equiangular With respect to the center-axis direction of the solid-state laser rod 1, the direction in which the distribution of heat dissipation levels is corrected by adjusting the deviation of the optical axes can be set to two or more directions that are not mutually parallel on a section of the solid-state laser rod. The two-dimensional homogeneity in distribution of heat dissipation levels on a section of the solid-state laser rod can therefore be attained effectively. Eventually, the bifocal rate observed in the circumferential direction, that is, the directivity in distribution of heat dissipation levels can be reduced drastically.

Figure 11:
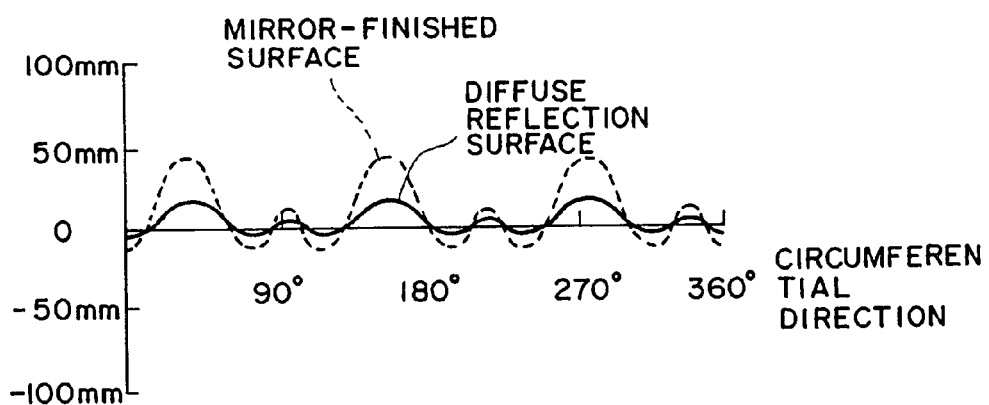
FIG. 11 is an explanatory graph showing a change in focal length in relation to positions in a circumferential direction on a section of the solid-state laser rod.

FIG. 11 shows a change in focal length from local point to local point in the circumferential direction on the margin of the solid-state laser rod occurring in a structure including a reflector that has a mirror-finished surface inside and a reflector that has a diffusive reflect surface inside. In the structure, pumping light is irradiated to the solid-state laser rod 1 in three directions that are equiangular with respect to the center-axis direction of the solid-state laser rod 1, that is, in three directions set at intervals of 120 and the magnitude of deviation of the optical axes is optimized in order to minimize the bifocal rate observed on a section of the solid-state laser rod. As mentioned above, the reflector 36 encircling the solid-state laser rod 1 reflects pumping light, which has not fallen on the solid-state laser rod 1, or pumping light, which has fallen on the solid-state laser rod 1 once but has not been absorbed by the solid-state laser rod 1 and has been emitted outside the solid-state laser rod 1, from the inside thereof, and thus changes the direction of propagation of the pumping light so that the pumping light can fall on the solid-state laser rod 1. Thus, the use efficiency of pumping light is improved.

The direction of reflection of light from a mirror-finished surface is determined uniquely by the direction of incidence of light, while the direction of reflection of light from diffusive reflect surface is diversified with a spread determined with the state of the diffusive reflect surface. Using a reflector having the diffusive reflect surface, therefore, as shown in FIG. 11, the bifocal rate observed in the circumferential direction on a section of the solid-state laser rod, that is, the directivity in distribution of heat dissipation levels Can be reduced drastically.

Furthermore, when the reflector 36 having the diffusive reflect surface also serves as a means fixing pumping sources, the bifocal rate observed in the circumferential direction on a section of the solid-state laser rod, that is, the directivity in distribution of heat dissipation levels can be improved greatly. Besides, the number of components of a pumping unit can be reduced, assembling of the components can be simplified, and the cost of the pumping unit can be reduced.

The pumping module 118 in this embodiment has the counterbored joint through holes 18 and joint screw holes 19 bored in the round flange on the margin of the substrate 9. A plurality of pumping modules 118 can be joined along the solid-state laser rod 1 and fixed firmly to normal placement positions highly accurately and readily. When the plurality of pumping modules 118 are joined along the solid-state laser rod 1 and put to use for the purpose of improving the performance of amplification, the distributions of pumped densities in the pumping modules can be matched with one another accurately. Thus, laser beam of high beam quality can be amplified stably and efficiently without any impairment of homogeneity in distribution of heat dissipation levels on a section of the solid-state laser rod.

Second Embodiment

Figure 12:
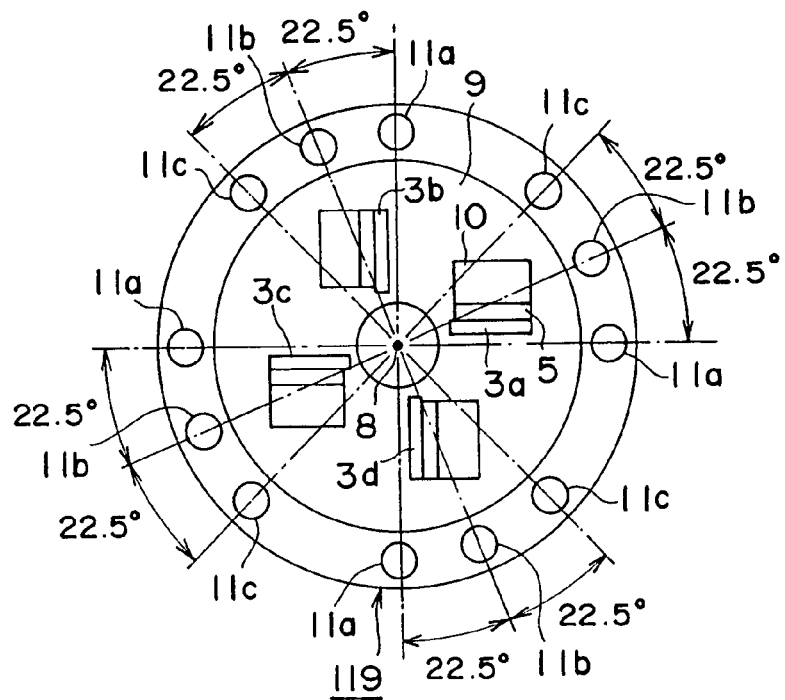
FIG. 12 is a front view of a pumping module in another example of a diode laser pumped solid-state laser amplifier of the present invention.

FIG. 12 is a front view of a pumping module in another example of a diode laser pumped solid-state laser amplifier of the present invention. In a pumping module 119 of this embodiment, three sets of four joint through holes 11a, 11b, and 11c each having four joint through holes arranged at intervals of 90° are bored in a round flange on the margin of the substrate 9. The joint through holes belonging to the three sets of joint through holes 11a, 11b, and 11c are located concentrically. The joint through holes 11b are located counterclockwise at an angle of 22.5° with respect to the joint through holes 11a. The joint through holes 11c are located counterclockwise at an angle of 22.5° with respect to the joint through holes 11b. The way of fixing the diode laser arrays 3a, 3b, 3c, and 3d that are pumping sources to the substrate 9 is identical to that in the first embodiment. When the pumping modules 119 of this embodiment are actually installed in a diode laser pumped solid-state laser amplifier, the solid-state laser rod 1 and flow tube 2 penetrate through the centers of the pumping modules 119 in a direction perpendicular to FIG. 12.

In the diode laser pumped solid-state laser amplifier having the above components, two pumping modules of the first pumping module 119 and second pumping module 119 are joined, the joint through holes 11a of the first pumping module 119 and the joint through holes 11b of the second pumping module 119 are used for joint. A direction in which the diode laser arrays 3 of the first pumping module 119 are placed and a direction in which the diode laser arrays 3 of the second pumping module 119 are placed are mismatched by 22.5° with the center axis of the solid-state laser rod 1 as a center.

Figure 13:
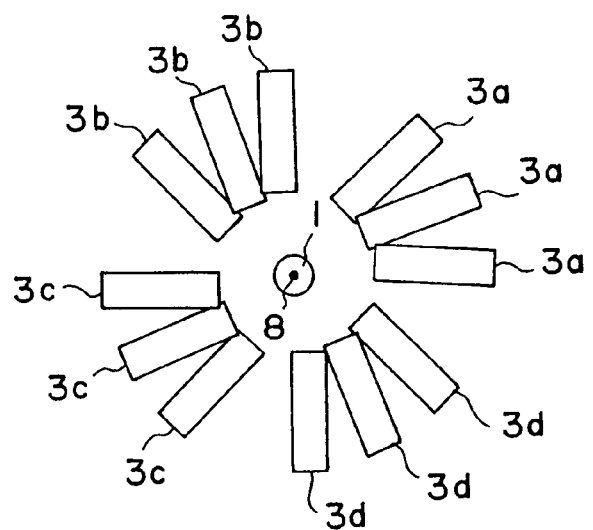
FIG. 13 shows models of diode laser arrays of the first to third pumping modules indicating placement positions of the diode laser arrays.

FIG. 13 shows models of the diode laser arrays 3a, 3b, 3c, and 3d included in the first pumping module 119, the diode laser arrays 3a, 3b, 3c, and 3d included in the second pumping module 119, and the diode laser arrays 3a, 3b, 3c, and 3d included in the third pumping module 119 in a state in which the three pumping modules 119 of the first pumping module 119, second pumping module 119, and third pumping module 119 are joined. FIG. 13 thus shows the positions at which the diode laser arrays are placed. In this embodiment, the adjoining pumping modules 119 can be joined while being shifted at equiangular intervals. The direction of irradiation of pumping light emanating from each pumping module can therefore be shifted at equiangular intervals. The number of directions of irradiation of pumping light to the solid-state laser rod 1 can be increased. The homogeneity in distribution of heat dissipation levels can be further improved. Moreover, the bifocal rate observed in the circumferential direction on a section of the solid-state laser rod can be reduced more reliably. Eventually, laser beam of high beam quality can be amplified stably and efficiently.

In this embodiment, the joint through holes 11a, 11b, and 11c are bored at intervals of 22.5° on the margin of the substrate 9. The angular interval between the joint through holes and the number of joint through holes are not limited to the ones in the embodiment, but may be set to any values as long as the distribution of pumped densities can be optimized according to the number of joined pumping modules and the layout of diode laser arrays to be locked in each pumping module.

Third Embodiment

Figure 14:
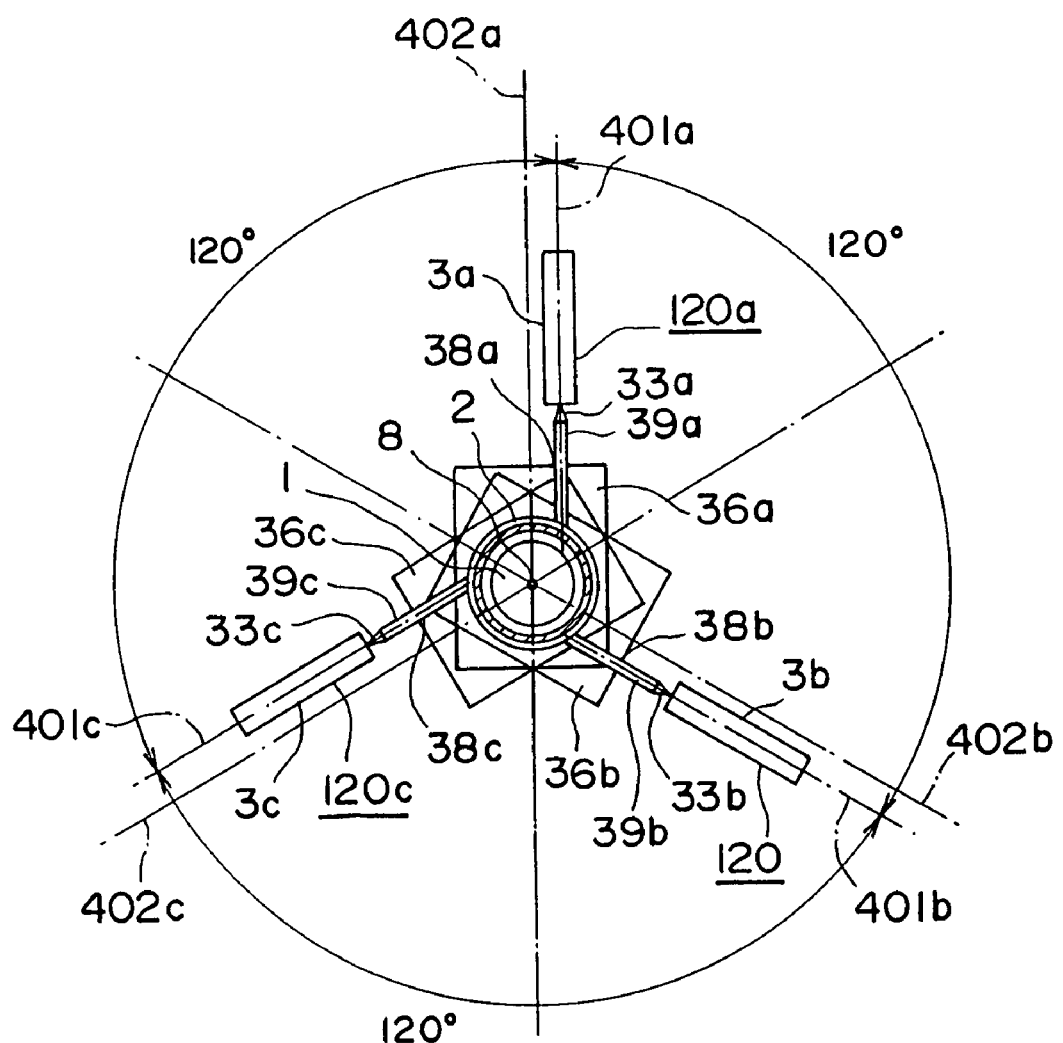
FIG. 14 is a front view of a pumping module in another example of a diode laser pumped solid-state laser amplifier of the present invention.
Figure 15:
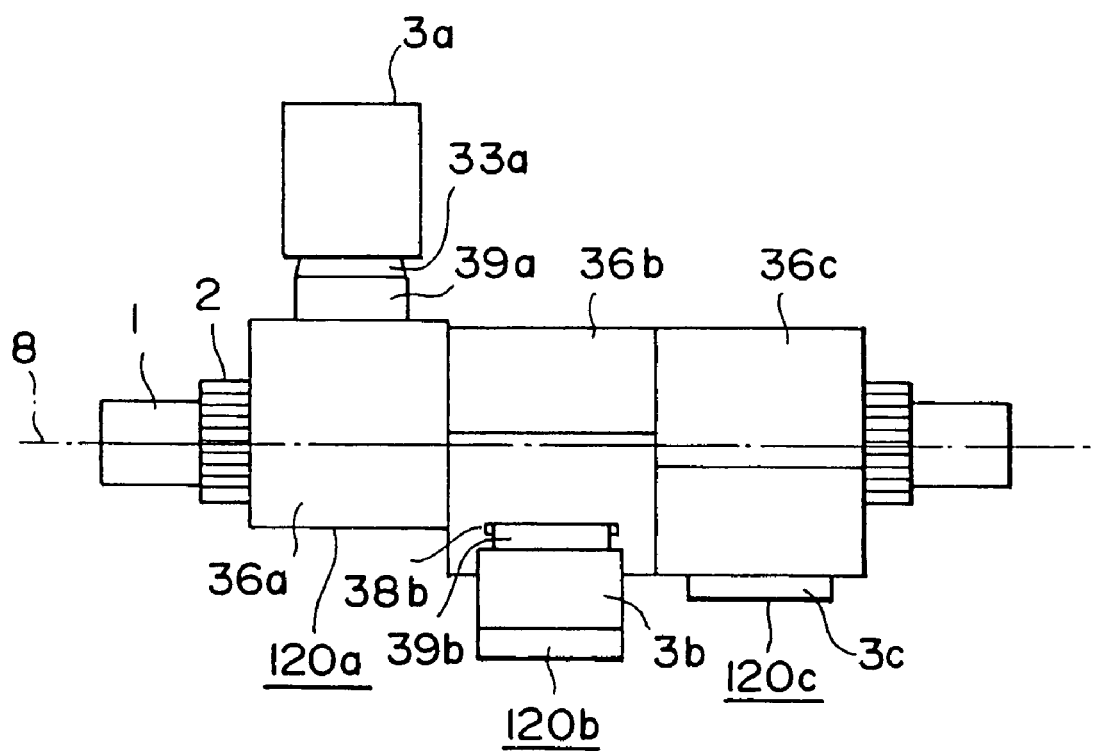
FIG. 15 is a side view of a pumping module in another example of a diode laser pumped solid-state laser amplifier of the present invention.

FIG. 14 is a front view of a pumping module in another example of a diode laser pumped solid-state laser amplifier of the present invention. FIG. 15 is a side view thereof. In this embodiment, three pumping modules 120a, 120b, and 120c having diode laser arrays 3a, 3b, and 3c respectively as a pumping source are layered along the solid-state laser rod 1 while being shifted at equiangular intervals. The diode laser arrays 3a, 3b, and 3c emit pumping light along optical axes 401a, 401b, and 401c respectively.

The optical axes 401a, 401b, and 401c run on different planes orthogonal to the axial core 8 of the solid-state laser rod 1, and are separated by a given distance from the axial core 8 of the solid-state laser rod 1 on the respective planes. When pumping light rays are projected on a plane orthogonal to the axial core 8 of the solid-state laser rod 1, adjoining ones of the optical axes have 120° between them. On the plane to which the pumping light rays are projected, a line parallel to the optical axis 401a and passing through the center of the solid-state laser rod 1 shall be a center line 402a, a line parallel to the optical axis 401b and passing through the center of the solid-state laser rod 1 shall be a center line 402b, and, a line parallel to the optical axis 401c and passing through the center of the solid-state laser rod 1 shall be a center line 402c. The optical axes 401a, 401b, and 401c are deviated from the center lines 402a, 402b, and 402c respectively in the same direction of rotation. In short, the optical axes are deviated counterclockwise in FIG. 14.

Putting it another way, when pumping light rays are projected on a plane orthogonal to the axial core 8 of the solid-state laser rod 1, the diode laser arrays 3a, 3b, and 3c that are pumping sources are located on the plane at equiangular intervals with respect to the axial core 8 of the, solid-state laser rod 1. That is to say, when pumping light rays are projected on a plane orthogonal to the-axial core 8 of the solid-state laser rod 1, the optical axes 401a, 401b, and 401c are located on the plane at equiangular intervals with the axial core 8 of the solid-state laser rod 1 as an axis of rotation.

Even in this embodiment, reflectors 36a, 36b, and 36c each having a diffusive reflect surface inside are employed. The reflectors 36a, 36b, and 36c have introduction ports 38a, 38b, and 38c through which pumping light 33 is introduced into inside. Moreover, optical waveguide plates 39a, 39b, and 39c are placed in the introduction ports 38a, 38b, and 38c. Pumping light rays emanating from the diode laser arrays 3a, 3b, and 3c propagate in the optical waveguide plates 39a, 39b, and 39c respectively and then fall on the reflectors 36a, 36b, and 36c respectively.

In the diode laser pumped solid-state laser amplifier of this embodiment, one diode laser array is included in one pumping module. Pumping light is irradiated to the solid-state laser rod 1 in one lateral direction. The distribution of pumped densities on a section of the solid-state laser rod formed by a sole pumping module is asymmetric. However, a change in wave front occurring when a laser beam passes through the solid-state laser rod 1 is proportional to an integral of a refractive index on a section of the solid-state laser rod observed in the center-axis direction of the solid-state laser rod. When the distributions of pumped densities formed by the three pumping modules are superposed in the axial direction, if the resultant distribution is symmetric, the change in wave front caused by the solid-state laser rod becomes symmetric.

In this embodiment, as mentioned above, when pumping light rays are projected on a plane orthogonal to the axial core of the solid-state laser rod, the optical axes along which the pumping light rays emanating from the three diode lasers propagate are located at equiangular intervals with respect to the axial core of the solid-state laser rod. The symmetry of a result of superposition of the distributions of pumped densities on a section of the solid-state laser rod formed by the three pumping modules can be improved greatly. Consequently, the bifocal rate observed in the circumferential direction on a section of the solid-state laser rod, that is, the directivity in distribution of heat dissipation levels can be reduced.

In the aforesaid first and second embodiments, pumping light is irradiated to the solid-state laser rod in four or three directions with respect to the optical axis of the solid-state laser rod. The number of directions of irradiation of pumping light is not limited to four and three. If the number of directions of irradiation increases, the bifocal rate observed in the circumferential direction on a section of the solid-state laser rod, that is, the directivity in distribution of heat dissipation levels can be reduced drastically. Moreover, when the magnitude of deviation of the optical axes is optimized according to the number of directions of irradiation, the bifocal rate observed on a section of the solid-state laser rod can be reduced more effectively. Eventually, the efficiency and stability in amplifying laser beam can be improved greatly.

Fourth Embodiment

Figure 16:
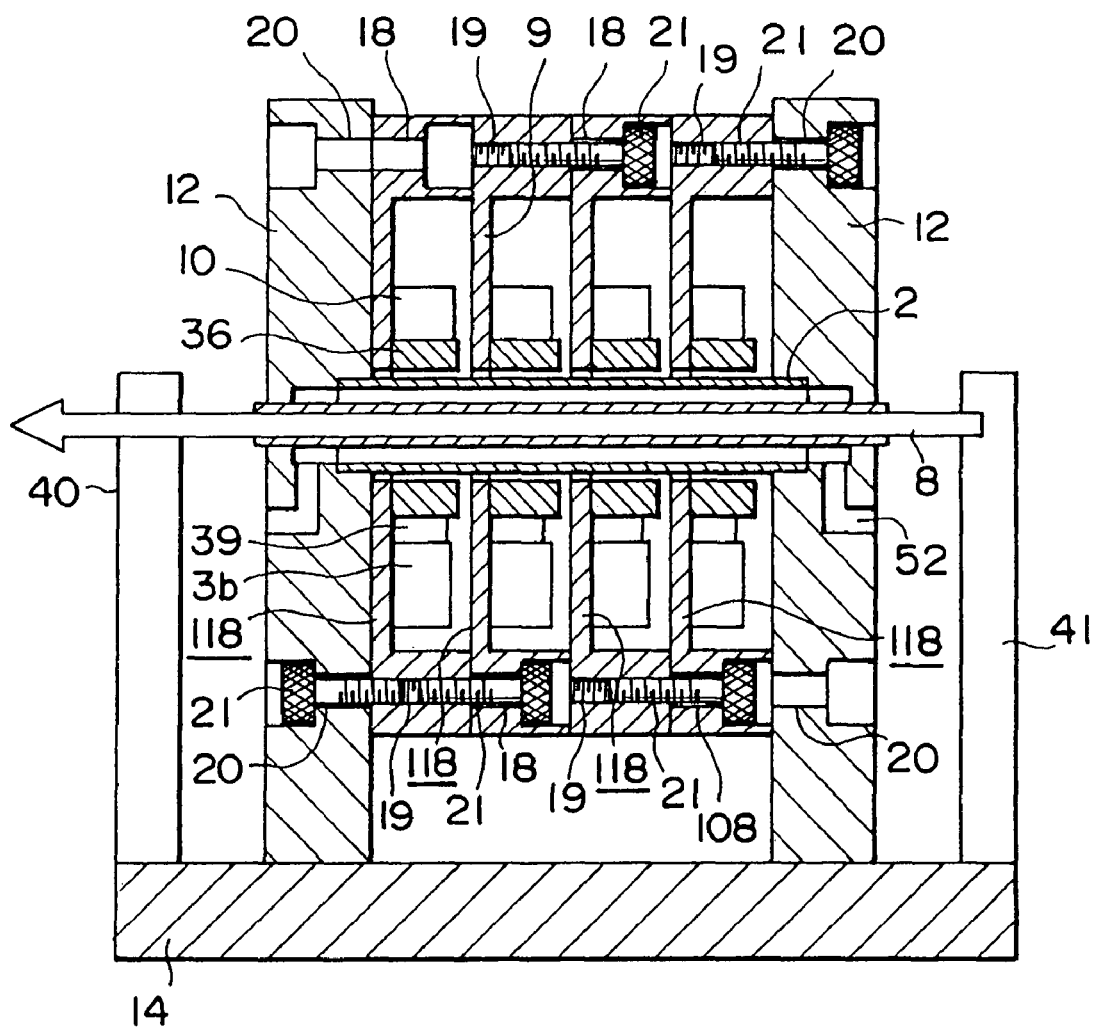
FIG. 16 is a cross-sectional view showing a diode laser pumped solid-state laser of the present invention.
Figure 17:
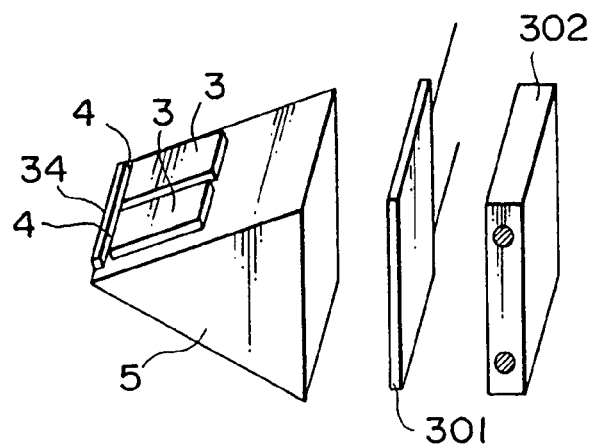
FIG. 17 shows the components of a pumping module employed in a conventional diode laser pumped solid-state laser amplifier.
Figure 18:
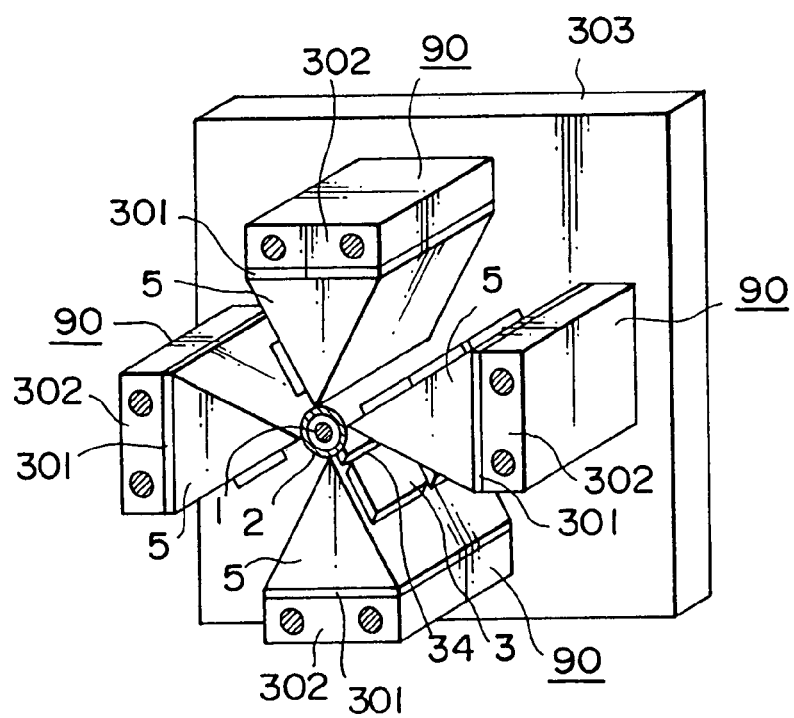
FIG. 18 is an oblique view showing a state in which conventional pumping modules each having the components shown in FIG. 17 are fixed to a support plate together with a solid-state laser rod and flow tube.

FIG. 16 Shows a cross section of a diode laser pumped solid-state laser of the present invention. In the aforesaid first and second embodiments, the structure of a diode laser pumped solid-state laser amplifier has been described. In this embodiment, the diode laser pumped solid-state laser using the diode laser pumped solid-state laser amplifier will be described.

A diode laser pumped solid-state laser 200 including pumping modules 118 each having the same components as the one in the first embodiment has a partial reflection mirror 40 and total reflection mirror 41 rested on the lower plate 14 so that the partial reflection and total reflection mirrors are located back and forth relative to the solid-state laser rod 1. Light stemming from spontaneous emission in the pumped solid-state laser rod 1 is reciprocated within an optical resonator and thus amplified, whereby a coherent laser beam 42 is produced. This structure is therefore used as a diode laser pumped solid-state laser. The partial reflection mirror 40 and total reflection mirror 41 constitute the optical resonator.

In this embodiment, either of the structures of the first and second embodiments can be employed in the diode laser pumped solid-state laser 200.

In any of the aforesaid embodiments, in a sole pumping module, pumping light emanating from a diode laser array is irradiated to a solid-state laser rod in four or three directions perpendicular to the optical axis of the solid-state laser rod. The number of diode laser arrays serving as pumping sources and the number of directions of irradiation of pumping light are not limited to those described in the embodiments. Any structure will do as long as pumping light can be irradiated laterally to the solid-state laser rod.

In any of the aforesaid embodiments, a diode laser array having a plurality of light-emitting devices arranged linearly is used as a pumping source. Needless to say, even when a diode laser having a sole light-emitting device is used, the same advantages can be exerted.

In this embodiment, a diode laser pumped solid-state laser produces a laser beam using a stable optical resonator constructed by placing a partial reflection mirror and total reflection mirror back and forth relative to the solid-state laser rod 1. The optical resonator is not limited to this type. Alternatively, for example, an unstable optical resonator for producing a laser beam due to diffraction of light may be constructed by plating total reflection mirrors back and forth relative to the solid-state laser rod 1.

According to one aspect of the-present invention, the provided a diode laser pumped solid-state laser amplifier which comprises a solid-state laser rod extending along the optical axis of a laser beam and including an active medium therein, and a plurality of pumping light sources having pumping light ray optical axes that run in a plane orthogonal to the axial of the solid-state laser rod and are separated by a predetermined distance from the axial of the solid-state laser rod, wherein when the optical axes of the plurality of pumping light sources are projected on a plane orthogonal to the axial of the solid-state laser rod, the optical axes of the plurality of pumping light sources are located at equiangular intervals with the axial of the solid-state laser rod as an axis of rotation on the plane. Consequently, a variation in distribution of heat dissipation levels in the circumferential direction on a section of the solid-state laser rod can be minimized, and a bifocal phenomenon will not take place. Eventually, the lens effect of the solid-state laser rod due to heat dissipation can be corrected effectively using a spherical mirror, convex lens, or concave lens. Laser beam of high beam quality can be amplified and generated stably and efficiently.

According to another aspect of the present invention, there is provided a diode laser pumped solid-state laser amplifier which has at least three pumping light sources are included. When pumping light rays emanating from the pumping light sources are projected on a plane orthogonal to the axial core of the solid-state laser rod, the pumping light rays are irradiated to the solid-state laser rod in at least three directions on the plane. Since the direction in which the distribution of heat dissipation levels is corrected by adjusting the deviation of the optical axes can be set to two or more directions that are not mutually parallel on a section of the solid-state laser rod, the distribution of heat dissipation levels on a section of the solid-state laser rod can be homogenized effectively. Consequently, the bifocal rate observed in the circumferential direction, that is, the directivity in distribution of heat dissipation levels can be reduced drastically.

According to still another aspect of the present invention, there is provided a diode laser pumped solid-state laser amplifier which has optical elements, interposed between the solid-state laser rod and the pumping light sources for positioning the pumping light ray optical axes with respect to the solid-state laser rod. Since the positions of the optical axes along which the pumping light rays propagate remain constant, stable distribution of pumped densities can be attained on a section of the solid-state laser rod. Efficient amplification and generation of laser beam of high beam quality can be maintained stably.

According to a further aspect of the present invention, there is provided a diode laser pumped solid-state laser amplifier, wherein the optical elements for positioning the pumping light ray optical axes are optical waveguide plates. The pumping light rays can be transmitted efficiently while being totally reflected by the optical waveguide plates. Moreover, since a focal length or the direction of condensing need not be taken into account for arrangement, assembling and adjustment can be achieved readily.

According to a still further aspect of the present invention, there is provided a diode laser pumped solid-state laser amplifier which has a reflector having openings for passing the pumping light rays and having a diffusive reflect surface which is provided so as to enclose the solid-state laser rod. The direction of reflection of light from the diffusive reflect surface is diversified with a spread determined by the state of the diffusive reflect surface. The directivity in distribution of heat dissipation levels in the circumferential direction on a section of the solid-state laser rod can therefore be eliminated, and occurrence of a bifocal phenomenon can be reduced drastically.

According to another aspect of the present invention, there is provided a diode laser pumped solid-state laser amplifier which has optical waveguide plates provided in the openings of the reflector as optical elements for positioning the pumping light ray optical axes. While the efficiency in transmitting the pumping light rays to the reflector is retained high, introduction ports of the reflector through which the pumping light rays are introduced can be made smaller. This results in efficient pumping.

According to still another aspect of the present invention, there is provided a diode laser pumped solid-state laser amplifier, wherein the reflector also serves as a means for fixing the pumping light sources. Consequently, the number of components can be reduced, assembling can be simplified, and cost can be reduced.

According to a further aspect of the present invention, there is provided a diode laser pumped solid-state laser amplifier which has side plates for supporting both ends of the solid-state laser rod respectively, a plurality of pumping modules arranged along the solid-state laser rod, each pumping nodule being constituted with a flat substrate having a hole formed at the center thereof through which the solid-state laser rod passed and the pumping light sources fixed by means for fixing it to the substrate, and connecting and fixing means for connecting a plurality of the pumping modules which is arranged along the solid-state laser rod each other and fixing the pumping modules to the side plates. The plurality of pumping modules can be joined and fixed to normal placement positions at placement angles highly accurately, simply, and firmly. The positional relationship among the plurality of pumping sources can remain constant. The performance of amplification can therefore be improved readily. Moreover, even when a disturbance such as mechanical vibrations occurs, since displacement of the pumping modules from the normal placement positions and placement angles and a break in positional relationship among the plurality of pumping sources can be suppressed, stable performance of amplification and stable laser output can be attained.

According to a still further aspect of the present invention, there is provided a diode laser pumped solid-state laser amplifier, wherein the pumping modules are connected each other at a predetermined angle while successively shifting the angle about the solid-state laser rod as a center axis. The number of directions of irradiation of pumping light to the solid-state laser rod can be increased, and a variation in distribution of heat dissipation levels occurring in the circumferential direction on a section of the solid-state laser rod can be reduced further. The bifocal rate observed in the circumferential direction on a section of the solid-state laser rod can be reduced reliably, and laser beam of high beam quality can be amplified stably and efficiently.

According to another aspect of the present invention, there is provided a diode laser pumped solid-state laser which comprises a solid-state laser rod extending along the optical axis of a laser beam and including an active medium therein, a plurality of pumping light sources having pumping light ray optical axes that pass through a plane orthogonal to the axial of the solid-state laser rod and are separated by a predetermined distance from the axial of the solid-state laser rod, a partial reflection mirror set to one end of the solid-state laser rod, and a total reflection mirror set to the other end of the solid-state laser rod, wherein when the optical axes of the plurality of pumping light sources are projected on a plane orthogonal to the axial of the solid-state laser rod, the optical axes of the plurality of pumping light sources are located at equiangular intervals with the axial of the solid-state laser rod as an axis of rotation on the plane. Thus, a high-efficiency and high-quality laser beam can be generated stably.

What is claimed is:

1. A diode laser pumped solid-state laser amplifier, comprising:

a solid-state laser rod extending along the optical axis of a laser beam and including an active medium therein; and at least three pumping light sources having pumping light ray optical axes that run in a plane orthogonal to an axial core of said solid-state laser rod and that are separated by a predetermined distance from the axial core of said solid-state laser rod, wherein when said optical axes of said at least three pumping light sources are projected on the plane orthogonal to the axial core of said solid-state laser rod, said optical axes of said at least three pumping light sources are located at equiangular intervals with the axial core of said solid-state laser rod as an axis of rotation on the plane, and when pumping light rays emanating from said pumping light sources are projected on the plane orthogonal to the axial core of said solid state laser rod, the pumping light rays are irradiated to said solid-state laser rod in at least three directions on the plane to increase homogeneity of distribution of heat dissipation levels along said solid-state laser rod, said diode laser pumped solid-state laser amplifier further comprising:

side plates for supporting both ends of said solid-state laser rod respectively;

a plurality of pumping modules arranged along said solid-state laser rod, each pumping module being constituted with a flat substrate having a hole formed at the center thereof through which said solid-state laser rod passed and said pumping light sources fixed to said substrate;

wherein said plurality of said pumping modules are interconnected, arranged along said solid-state laser rod, and fixed to said side plates.

2. A diode laser pumped solid-state laser amplifier according to claim 1, wherein said pumping modules are interconnected at a predetermined angle while successively shifting the angle about said solid-state laser rod as a center axis.

* * * * *